(12) United States Patent
Parsons

(10) Patent No.: US 11,975,860 B2
(45) Date of Patent: May 7, 2024

(54) REDUCED-ENGINE OPERATION TECHNIQUE FOR ROTORCRAFT

(71) Applicant: Bell Textron Inc., Fort Worth, TX (US)

(72) Inventor: Thomas Dewey Parsons, Forth Worth, TX (US)

(73) Assignee: Textron Innovations Inc., Providence, RI (US)

( * ) Notice: Subject to any disclaimer, the term of this patent is extended or adjusted under 35 U.S.C. 154(b) by 270 days.

(21) Appl. No.: 17/569,996

(22) Filed: Jan. 6, 2022

(65) Prior Publication Data

US 2023/0211876 A1    Jul. 6, 2023

(51) Int. Cl.
*B64C 27/57* (2006.01)
*B64D 31/06* (2006.01)
*F02C 9/42* (2006.01)

(52) U.S. Cl.
CPC ............ *B64D 31/06* (2013.01); *F02C 9/42* (2013.01); *F05D 2220/329* (2013.01); *F05D 2270/093* (2013.01); *F05D 2270/13* (2013.01)

(58) Field of Classification Search
CPC ........... B64D 31/06; B64D 35/08; F02C 9/42; F05D 2220/329; F05D 2270/093; F05D 2270/13; F05D 2260/84; B64C 27/57; B64C 27/06
See application file for complete search history.

(56) References Cited

U.S. PATENT DOCUMENTS

| | | | |
|---|---|---|---|
| 10,961,915 B2 | 3/2021 | Simonetti et al. | |
| 2014/0145028 A1 | 5/2014 | Gomez | |
| 2018/0273196 A1 | 9/2018 | Bel | |
| 2019/0055004 A1* | 2/2019 | Schaeffer | G05D 1/0858 |
| 2020/0049025 A1 | 2/2020 | Morgan et al. | |
| 2020/0095939 A1* | 3/2020 | Epstein | B64D 33/08 |
| 2020/0255159 A1 | 8/2020 | Manoukian et al. | |
| 2020/0256265 A1 | 8/2020 | Manoukian | |
| 2020/0362753 A1 | 11/2020 | Beauchesne-Martel et al. | |
| 2020/0362754 A1 | 11/2020 | Beauchesne-Martel et al. | |
| 2021/0197962 A1 | 7/2021 | Brand et al. | |

FOREIGN PATENT DOCUMENTS

| | | | | |
|---|---|---|---|---|
| EP | 3627271 A1 * | 3/2020 | | B64C 27/02 |
| EP | 3738874 A | 11/2020 | | |

OTHER PUBLICATIONS

EP 22214657.3 European Third Party Observation (Rule 114 (2)) dated Oct. 26, 2023; pp. 1-39.
EP 22214657.3 European Search Report dated May 12, 2023, pp. 1-4.

* cited by examiner

*Primary Examiner* — Justin Holmes
(74) *Attorney, Agent, or Firm* — Akona IP PC

(57) ABSTRACT

Various implementations described herein are directed to an aircraft having a multi-engine configuration with multiple engines. The aircraft may have a flight control system coupled to the multiple engines with a multi-engine interface. The flight control system may be configured to shutdown at least one engine of the multiple engines during reduced-engine operation by continuously calculating altitude for the reduced-engine operation based on one or more of an aircraft descent rate of the aircraft and an engine restart time of the at least one engine.

20 Claims, 7 Drawing Sheets

REDUCED-ENGINE OPERATION TECHNIQUE FOR ROTORCRAFT

STATEMENT REGARDING FEDERALLY SPONSORED RESEARCH OR DEVELOPMENT

Not applicable.

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some aircraft designs, multiple engines are used to maintain a helicopter in flight in the case of single-engine failure. However, many risks are associated with turning-off an engine while in flight. For instance, if the operating engine failed during single-engine flight, then the off-line engine would require restarting prior to safe landing. This can be difficult to implement in modern helicopter designs with conventional flight control systems. As such, there exists a need to improve flight control systems for modern aircraft designs that provide for safe shutdown of an engine during flight.

BRIEF DESCRIPTION OF THE DRAWINGS

Implementations of various memory layout schemes and techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are related to reduced-engine operation schemes and techniques for aircraft, such as, e.g., a helicopter or some other type of similar rotorcraft. Also, the various reduced-engine operation schemes and techniques may be used in various types of rotorcraft having a multi-engine configuration with multiple engines, such as, e.g., multiple turbo-shaft engines or other types of similar engines. While reduced-engine operation in a multi-engine rotorcraft may improve fuel efficiency, there are risks associated with turning-off an engine in flight. For instance, if the online engine were to fail, the off-line engine may need restarting prior to a safe landing. Thus, various implementations described herein provide for a control technique and pilot display interface for implementing reduced-engine operation on a rotorcraft. As described herein, the methods, schemes and techniques described herein provide for real-time continuous calculation of a minimum altitude needed for reduced-engine operation by balancing aircraft descent rate with engine restart time. The methods, schemes and techniques described herein also provide a pilot display with a control interface, visual indications, status messages, and also associated caution-warning-advisory (CWA) messages. In some scenarios, the minimum altitude for reduced-engine operation is continually calculated as a function of various ambient conditions, wherein a sufficient altitude is necessary to operate the rotorcraft in a reduced-engine operation (REO) mode.

Various implementations of reduced-engine operation schemes and techniques for various rotorcraft architectures will be described herein with reference to FIGS. 1-6.

Figure 1:
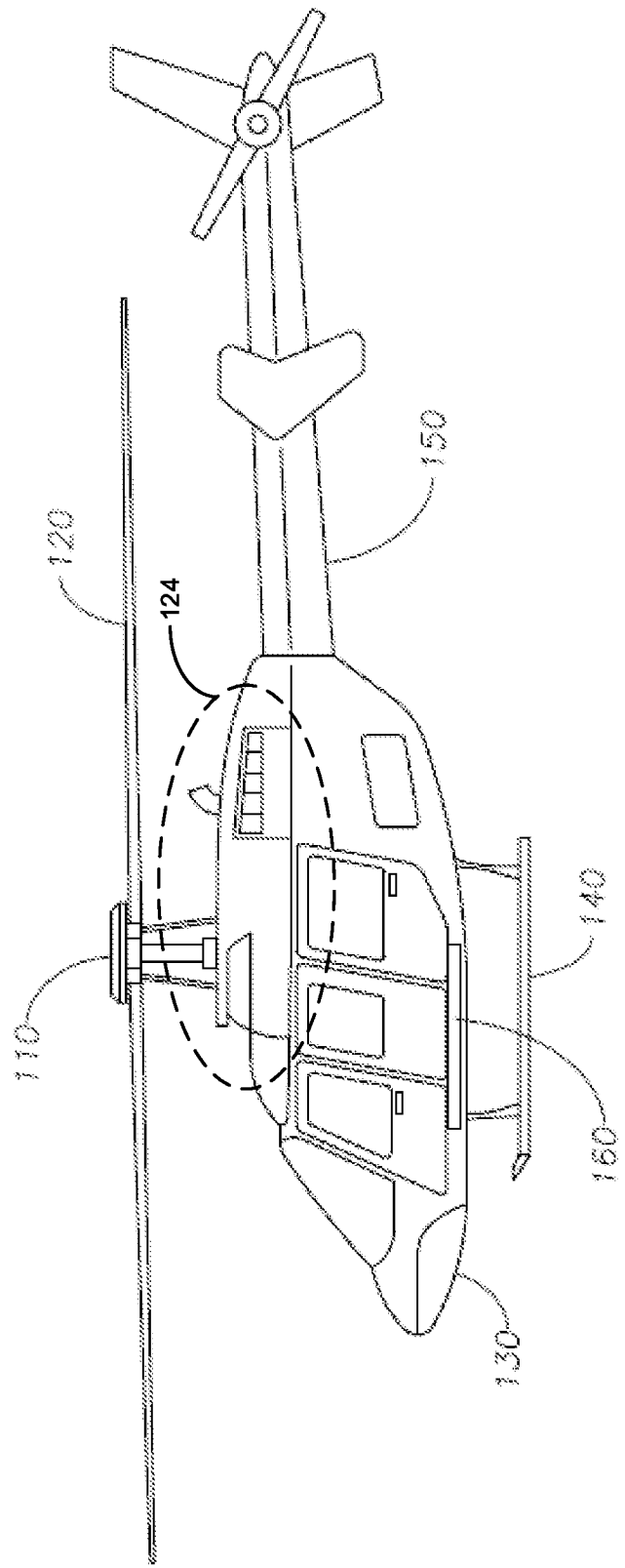
FIG. 1 illustrates a diagram of a rotorcraft architecture in accordance with various implementations described herein.

FIG. 1 illustrates a diagram 100 of rotorcraft architecture 104 in accordance with various implementations described herein. The rotorcraft architecture 104 may comprise an aircraft, such as, e.g., a helicopter or some other type of similar rotorcraft.

Figure 2A:
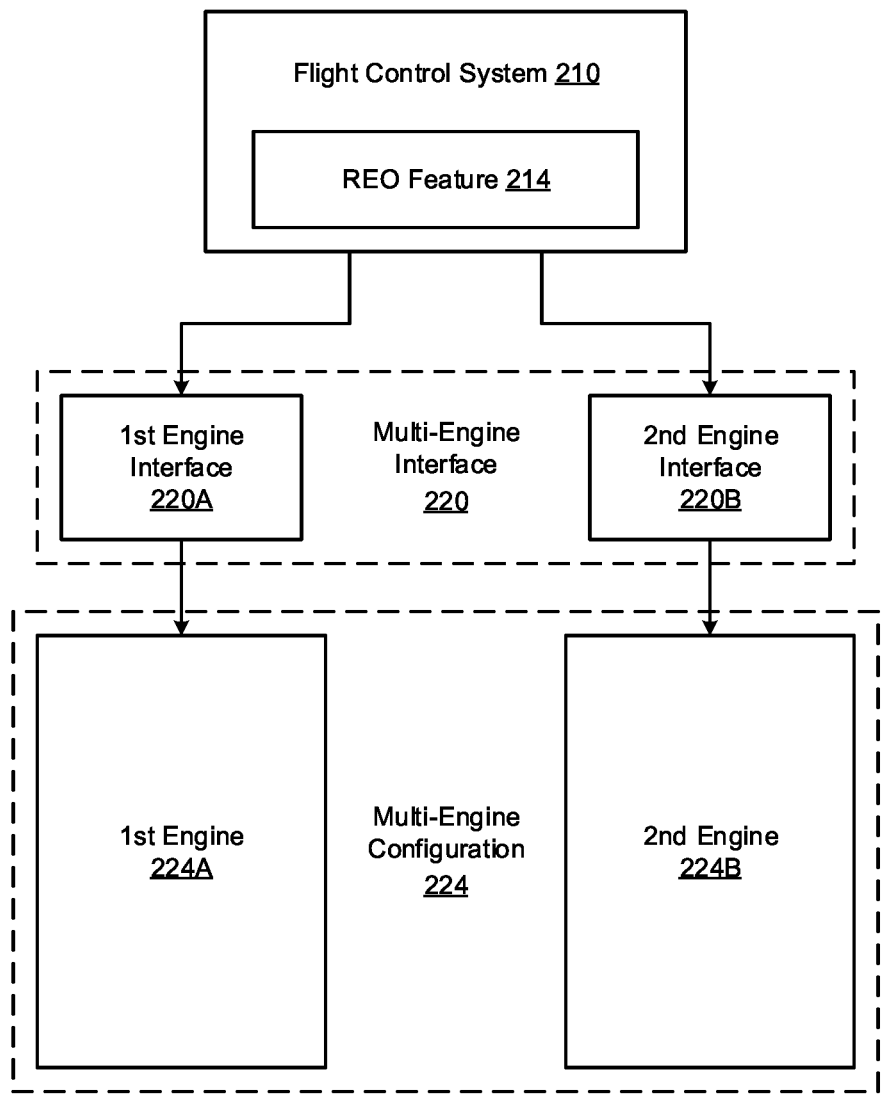
FIGS. 2A-2B illustrate diagrams of multi-engine architecture in accordance with various implementations described herein.
Figure 2B:
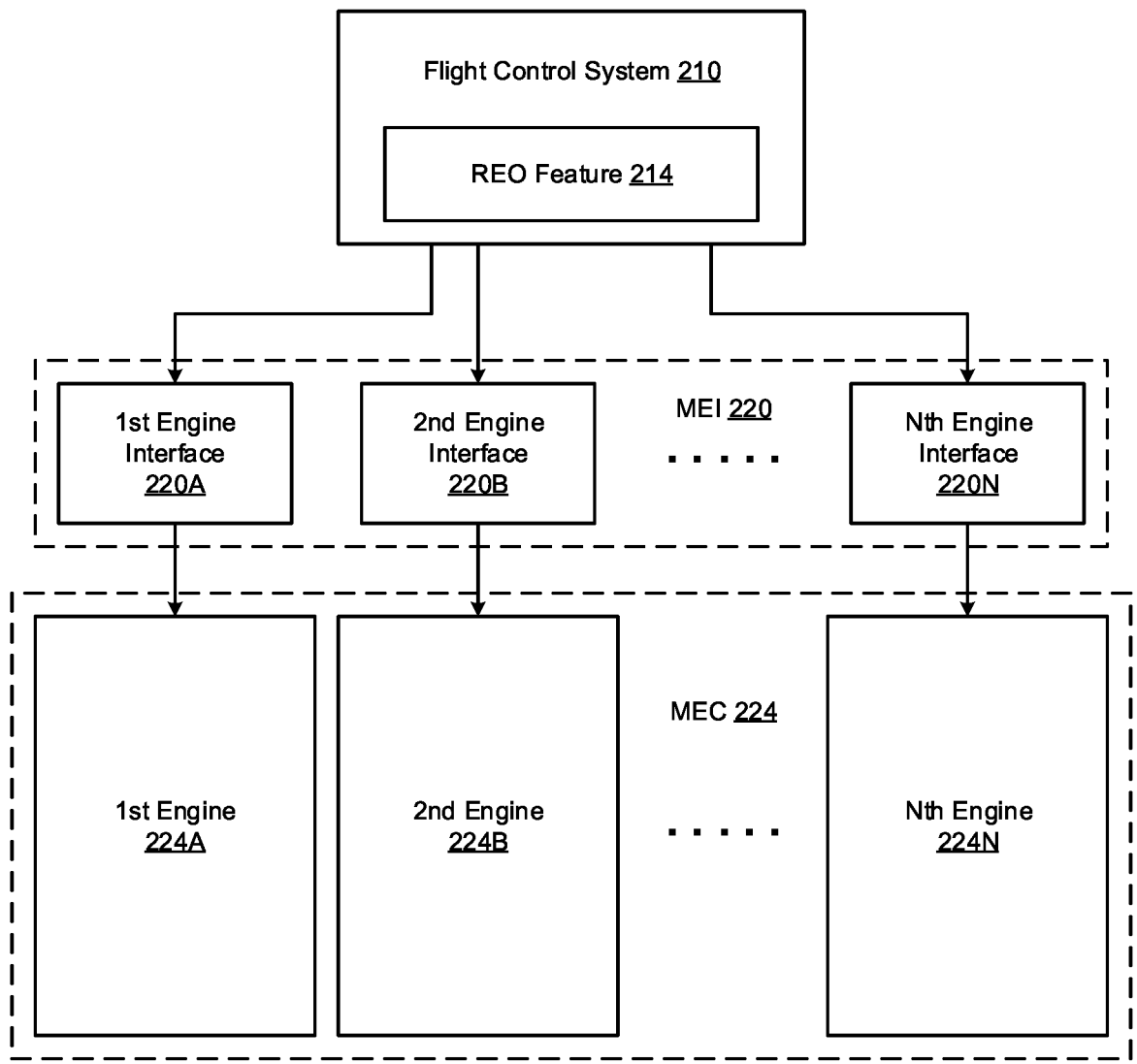
Figure 3:
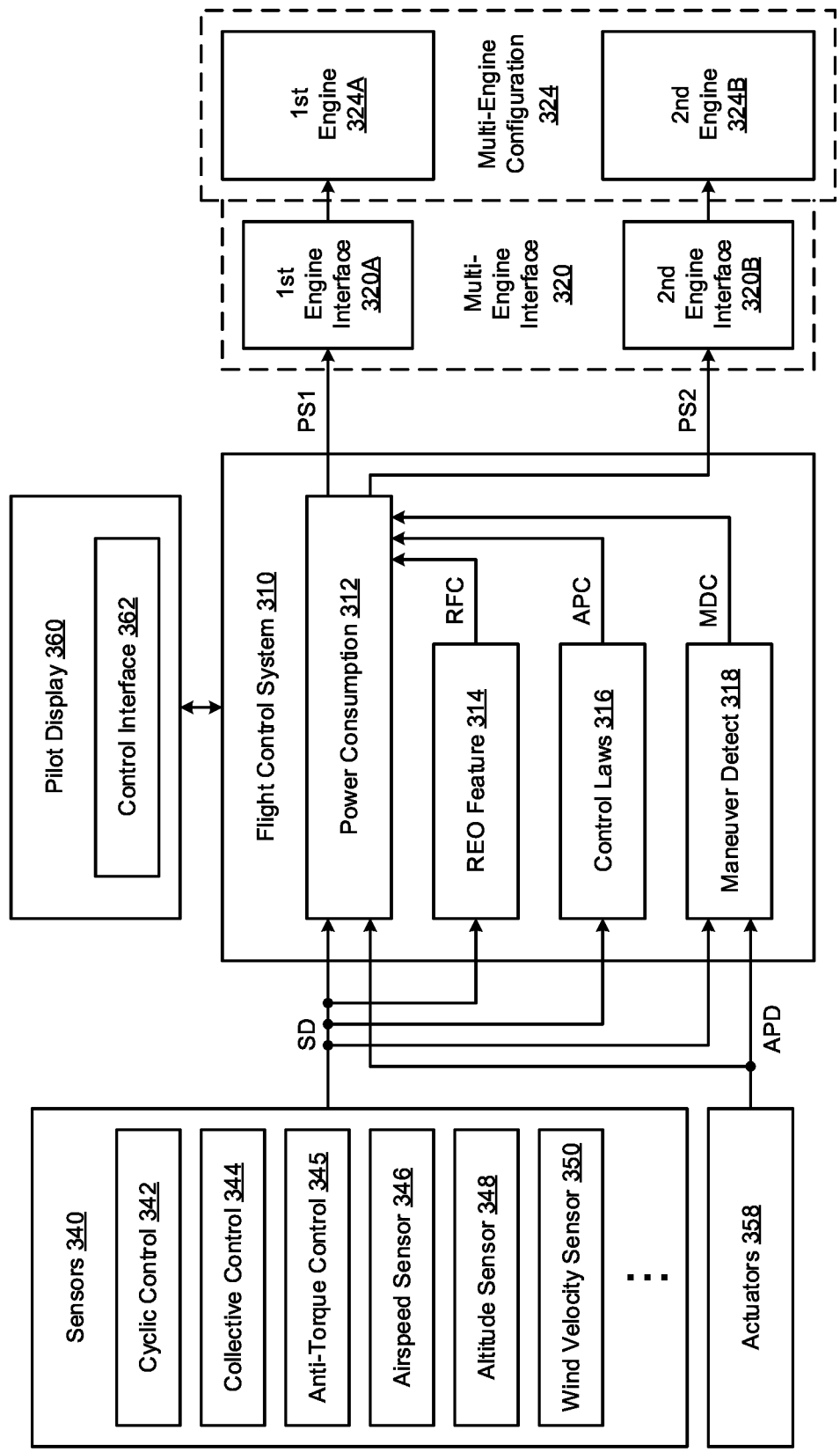
FIG. 3 illustrates a schematic diagram of a multi-engine flight formation system in accordance with implementations described herein.

In various implementations, the rotorcraft architecture 104 refers to various types of rotary-wing aircraft, such as, e.g., a rotorcraft, a helicopter or similar. The rotorcraft 104 includes a rotor system 110, one or more blades 120, a fuselage 130, landing gear 140, and an empennage 150. The rotor system 110 is attached to an upper portion of the fuselage 130, and also, the rotor system 110 has an engine compartment 124 with multiple engines arranged in a multi-engine configuration. The rotor system 110 may be configured to rotate the blades 120 during flight, and also, the rotor system 110 may utilize a flight control system (not shown) for selectively controlling the pitch of each blade of the blades 120 so as to allow a pilot to selectively control direction, thrust, and/or lift of the rotorcraft 104. As described in greater detail herein, the flight control system (e.g., as shown in FIGS. 2A-2B and 3) may be used to operate multiple engines in a reduced-engine operation (REO) mode that refers to a high-efficiency mode of operation for shutting-down at least one engine of the multiple engines, e.g., during take-off, flight, and/or landing. In some scenarios, the reduced-engine operation (REO) may refer to a reduced-engine cruise mode of operation, such as, e.g., a single-engine cruise (SEC) mode of operation.

FIGS. 2A-2B illustrate diagrams of multi-engine architecture 204 in accordance with various implementations described herein. In particular, FIG. 2A shows a diagram of a multi-engine architecture 204A with multiple engines, such as, e.g., two engines in a multi-engine configuration, such as, e.g., a twin-engine configuration, and in addition, FIG. 2B shows a diagram of another multi-engine architecture 204B with multiple engines, such as, e.g., two or more engines in a multi-engine configuration. The multi-engine architecture 204 may utilize a reduced-engine operation (REO) technique for an aircraft or rotorcraft.

In various implementations, as shown in FIG. 2A, the multi-engine architecture 204A may be utilized in various types of aircraft, such as, e.g., the rotorcraft architecture 104 shown in FIG. 1, which may refer to a rotary-wing type of aircraft, such as, e.g., a helicopter or a similar type of rotorcraft. The multi-engine architecture 204A may include a multi-engine configuration (MEC) 224 with multiple engines 224A, 224B, such as, e.g., two engines in a twin-engine configuration. In addition, the multi-engine architecture 204A may include a flight control system 210 coupled to the multiple engines 224A, 224B with a multi-engine interface (MEI) 220 having multiple engine interfaces, including, e.g., a first engine interface 220A and a second engine interface 220B. In some scenarios, the flight control system 210 is coupled to the first engine 224A via the first engine interface 220A, and the flight control system 210 is also coupled to the second engine 224B via the second engine interface 220B. Also, the multi-engine configuration (MEC) 224 utilizes the multiple engines 224A, 224B, such as, e.g., multiple turbo-shaft engines or various other types of similar engines.

In some implementations, the flight control system 210 includes a reduced-engine operation (REO) feature 214 (or control module) that is configured to implement the reduced-engine operation (REO) technique. The flight control system 210 is configured to shutdown at least one engine of the multiple engines 224A, 224B during reduced-engine operation (REO) by continuously calculating altitude (such as, e.g., minimum altitude) for the reduced-engine operation (REO) based on one or more of an aircraft descent rate (ADR) of the aircraft (e.g., the rotorcraft) and an engine restart time (ERT) of the at least one engine selected for shutdown. In some scenarios, as shown in reference to FIG. 2A, the multiple engines 224A, 224B may include two engines, and the reduced-engine operation (REO) may refer to a reduced-engine cruise or a single-engine cruise (SEC) mode of operation for shutting-down at least one engine of the two engines. In some other scenarios, as shown in reference to FIG. 2B, the multiple engines 224A, 224B, . . . , 224N may include any number (N) of engines, such as, e.g., two or more engines, and also, the reduced-engine operation (REO) may refer to a high-efficiency mode of operation for shutting-down one or two or more engines of the two or more engines. Also, the multi-engine configuration (MEC) 224A, 224B utilizes the multiple engines 224A, 224B, . . . , 224N, such as, e.g., multiple turbo-shaft engines or various other types of similar engines.

In some implementations, the aircraft descent rate (ADR) may be based on current ambient conditions related to the altitude, including, e.g., outside ambient temperature (OAT) during autorotation of the aircraft (e.g., rotorcraft) with the at least one engine of the multiple engines shutdown. Also, the engine restart time (ERT) may refer to a function of the current ambient conditions related to one or more of the altitude, outside ambient temperature (OAT), and measured gas temperature (MGT) of the engine. Also, the flight control system 210 may be configured to continuously calculate the altitude as a minimum altitude needed for reduced-engine operation (REO) based on a pre-determined balance between the aircraft descent rate (ADR) and the engine restart time (ERT).

In various implementations, the flight control system 210 provides visual indication of the altitude to a pilot with a gauge including current altitude versus a minimum altitude for the reduced-engine operation (REO). Also, the flight control system 210 may be configured to calculate the minimum altitude based on one or more of pressure altitude, density altitude and height above-ground-level (AGL), and the flight control system 210 may be configured to calculate the minimum altitude with an altitude margin built-in for safety. In some scenarios, the gauge may refer to a dedicated reduced-engine operation (REO) display control panel that has an altitude gauge, one or more push buttons to engage/disengage the reduced-engine operation (REO), and/or a visual display that displays status messages and caution-warning-advisory (CWA) messages related to the REO system. Also, in some scenarios, the flight control system 210 may be configured to prevent activation of the reduced-engine operation (REO) when any FADEC caution-warning-advisory (CWA) messages are active. Also, the gauge provides a mode message that indicates availability of the reduced-engine operation (REO) based on the current altitude versus the minimum altitude, and the gauge provides an engaged-disengaged message that indicates whether the reduced-engine operation (REO) is currently engaged or disengaged.

In some implementations, the flight control system 210 is configured to selectively shutdown at least one engine of the multiple engines based on input from a pilot, and also, the flight control system 210 is configured to provide visual indication (e.g., via the gauge) of the at least one engine selectively shutdown by the pilot. Further, while in the reduced-engine operation (REO) during flight, if the altitude as a current altitude drops significantly below the calculated minimum required altitude, then the flight control system 210 may be configured to automatically restart the shutdown engine and also provide corresponding advisory messages to a pilot. In some scenarios, while in reduced-engine operation during flight, if the altitude as a current altitude drops below a predetermined altitude, such as, e.g., a minimum required altitude, then the flight control system may be configured to automatically restart the shutdown engine and provide corresponding advisory messages to a pilot.

In some implementations, when the reduced-engine operation (REO) is selectively activated by a pilot during flight, the flight control system 210 may be configured to calculate and determine whether sufficient altitude is available and/or unavailable for reduced-engine operation (REO). If the sufficient altitude is determined, then the flight control system 210 may be configured to allow engine shutdown of the at least one engine during the reduced-engine operation (REO) and also provide an indication message (e.g., via the gauge) to the pilot that the reduced-engine operation is available and active. Also, if insufficient altitude is determined, then the flight control system 210 may be configured to prevent engine shutdown of the at least one engine during flight and provide a warning message (e.g., via the gauge) to the pilot that the reduced-engine operation (REO) is unavailable and inactive.

Further, in some implementations, upon selective activation of the reduced-engine operation (REO) by a pilot, the flight control system is configured to adjust operation of the at least one engine of the multiple engines by throttling the at least one engine to IDLE, sub-IDLE, or completely OFF (i.e., completely shutdown). Also, upon activation of the reduced-engine operation (REO) by a pilot, the flight control system 210 may be configured to reduce airspeed prior to shutdown of at least one engine of the multiple engines so as to prevent over-torque or over-temperature on at least one active engine of the multiple engines when the at least one engine of the multiple engines is shutdown.

In various scenarios, during take-off of the rotorcraft, the flight control system 210 may utilize the REO feature 214 to engage one engine or two engines based on the ambient conditions described herein. In other scenarios, during flight of the rotorcraft, the flight control system 210 may utilize the REO feature 214 to engage one engine or two engines for single-engine cruise (SEC) based on the ambient conditions described herein. In other scenarios, during landing of the rotorcraft, the flight control system 210 may utilize the REO feature 214 to engage one engine or two engines based on the ambient conditions described herein.

In various implementations, as shown in FIG. 2B, the multi-engine architecture 204B may be utilized in various types of aircraft, such as, e.g., the rotorcraft architecture 104 shown in FIG. 1, which may refer to a rotary-wing type of aircraft, such as, e.g., a helicopter or a similar type of rotorcraft. The multi-engine architecture 204B may include a multi-engine configuration (MEC) 224B with any number (N) of engines 224A, 224B, ..., 224N, such as, e.g., two or three or more engines, and also, the reduced-engine operation (REO) may refer to a high-efficiency mode of operation for shutting-down one or two or more engines of the two or three or more engines. Moreover, in various scenarios, the multi-engine configuration (MEC) 224B utilizes the multiple engines 224A, 224B, ..., 224N, such as, e.g., multiple turbo-shaft engines or various other types of similar engines. Also, the multi-engine architecture 204A may have the flight control system 210 coupled to the multiple engines 224A, 224B, ..., 224N with the multi-engine interface (MEI) 220 having any number (N) of engine interfaces 220A, 220B, ..., 220N coupled to corresponding engines 224A, 224B, ..., 224N. In some scenarios, the flight control system 210 may be coupled to the multiple engines 224A, 224B, ..., 224N via the corresponding engine interfaces 220A, 220B, ..., 220N.

In various implementations, the flight control system 210 has the reduced-engine operation (REO) feature 214 (or control module) that is configured to implement the reduced-engine operation (REO) technique. The flight control system 210 is configured to shutdown one or more engines of the multiple engines 224A, 224B, ..., 224N during reduced-engine operation (REO) by continuously calculating the minimum altitude required for the reduced-engine operation (REO) based on one or more of an aircraft descent rate (ADR) of the aircraft (e.g., the rotorcraft) and an engine restart time (ERT) of the one or more engines selected for shutdown. In some scenarios, as shown in reference to FIG. 2B, the multiple engines 224A, 224B, ..., 224N may have any number (N) of engines, such as, e.g., two or three or more engines, and also, the reduced-engine operation (REO) may refer to a high-efficiency mode of operation for shutting-down one or two or more engines of the two or more engines. Also, the multi-engine configuration (MEC) 224B utilizes the multiple engines 224A, 224B, ..., 224N, such as, e.g., multiple turbo-shaft engines or various other types of similar engines.

In various scenarios, during take-off of the rotorcraft, the flight control system 210 may utilize the REO feature 214 to engage one or two or more engines based on the ambient conditions described herein. In other scenarios, during flight of the rotorcraft, the flight control system 210 may utilize the REO feature 214 to engage one or two or more engines for the reduced-engine operation (REO) based on the ambient conditions described herein. Further, in various other scenarios, during landing of the rotorcraft, the flight control system 210 may utilize the REO feature 214 to engage one or two or more based on the ambient conditions described herein. For instance, during flight of the rotorcraft, the flight control system 210 may utilize the REO feature 214 to engage three of five engines (or two of four engines) for the reduced-engine operation (REO) based on the ambient conditions.

In various implementations, in reference to FIGS. 2A-2B, the flight control system 210 is configured to provide for every phase of air-flight of an aircraft, rotorcraft, helicopter or similar, including, e.g., take-off, flight, cruise, and landing. In various instances, each engine (e.g., each turbo-shaft engine) may have a gas generator and a free turbine supplied by the gas generator to provide power to the rotor blades. At take-off and in continuous speed, the power supplied to the rotor blades may range between pre-determined minimum values and maximum values. Also, each gas generator has an air compressor coupled to a combustion chamber to compress air and fuel for expansion in the turbine to thereby drive into rotation the compressor via driving shafts. The gases also drive a free power transmission turbine, and the free turbine transmits power via a power transfer box that centralizes the power supplied to the loads (e.g., rotor driving, pumps, alternators, starter/generator device, etc.).

In various implementations, the multiple engines in the multi-engine configurations are substantially similar or somewhat different, and each engine may be coupled to a driver in the engine interface. Also, each driver drives into rotation a corresponding gas generator and/or a starter for starting and/or re-starting a corresponding engine. During operation, each engine and driver combination may be managed, controlled and operated by the flight control system 210, which may be under supervisory control by a digital command device for flight motorization, such as, e.g., full-authority digital engine control (FADEC).

FIG. 3 illustrates a diagram 300 of a multi-engine flight formation system 304 in accordance with implementations described herein.

As shown in FIG. 3, the multi-engine flight formation system 304 may be used in various types of aircraft, such as, e.g., the rotorcraft 104 in FIG. 1. The multi-engine flight formation system 304 may have a flight control system 310 with a power consumption module 312, a reduced-engine operation (REO) feature module 314, a control laws module 316, and a maneuver detect module 318. The power consumption module 312 may utilize a formation flight program that is executed on a flight control computer (FCC) in data communication with sensors 340, actuators 358, and an engine subsystem having a multi-engine interface 320 and a multi-engine configuration 324. The flight control system 310 may use the control laws module 316 to generate actuator position commands APC to move the actuators 358 based on sensor data SD from the sensors 340. The power consumption module 312 may use the sensor data SD from the sensors 340, actuator position commands APC, control laws module 316, actuator position data APD from actuators 358, or any combination thereof to determine and/or anticipate real-time power demand of multiple engines 324A, 324B, which may include any number of engines in a manner as described herein, e.g., in FIGS. 2A-2B.

In various implementations, the flight control system 310 is configured to generate and provide one or more power signals PS1, PS2 to the multi-engine interface 320 so as to modify and/or adjust power output of the multiple engines 324A, 324B. For instance, engine control may be performed in response to pilot commands or, in case of unmanned computer-controlled aircrafts (or auto-pilot mode), as directed by multi-engine flight formation system 304 of the rotorcraft. In various implementations, the multi-engine interface 320 may have multiple engine interfaces 320A, 320B to adjust the power output of the multiple engines 324A, 324B before application of the power signals PS1, PS2 by the power consumption module 312 to the multiple engines 324A, 324B so as to maintain the rotational speed of one or more blades 120 of the rotorcraft 104 within a determined aircraft positioning.

In some implementations, the sensors 340 may detect various flight parameters of the rotorcraft 104 to form the sensor data SD that is used by the power consumption module 312, either directly or indirectly, to control flight of the rotorcraft 104. The sensors 340 may have a cyclic control sensor 342 that detects position or motion of cyclic control, which forms part of the sensor data SD. The sensors 340 may have a collective control sensor 344 that detects a position or movement of the collective control of rotorcraft 104. The sensors 340 may also have an anti-torque control sensor 345 that detects a position or movement of the anti-torque control (e.g., pedal input) of the rotorcraft 104. The sensors 340 may have an airspeed sensor 346 (e.g., as part of a pitot-tube/pitot-system) that may utilize a doppler radar, global positioning satellites and/or other airspeed detection techniques. The sensors 340 may also have an altitude sensor 348, such as, e.g., a radar altimeter, an attitude sensor and/or an above-ground-level AGL detector. The sensors 340 may also have a wind velocity sensor 350. In various other instances, the different types of sensors 340 may also include an aircraft gross weight sensor (e.g., cargo weight sensor), a rotor speed sensor, a nacelle tilt angle sensor, a helicopter/tiltrotor aircraft pylon angle sensor, an engine power turbine output speed sensor, an engine gas temperature sensor, a throttle position sensor, an engine compressor speed sensor, an engine torque output sensor, an actuator position sensor, a pressure altitude sensor, a compressor air temperature sensor, a fuel metering valve position sensor, etc.

In various implementations, the flight control system 310 is configured to receive the sensor data SD from the sensors 340 and also receive the actuator position data APD from the actuators 358. In some scenarios, the sensors 340 may provide sensor data to the modules 312, 314, 316, 318, and the actuators 358 may provide actuator position data APD to the modules 312, 318. As such, the reduced-engine operation (REO) feature module 314 may receive sensor data SD and provide REO feature command signals RFC to the power consumption module 312 based on the sensor data SD. Also, the control laws module 316 may receive sensor data SD and then provide actuator position command signals APC to the power consumption module 312 based on the sensor data SD. Further, the maneuver detect module 318 may also receive sensor data SD and then provide maneuver detect command signals MDC to the power consumption module 312 based on the sensor data SD. Moreover, the power consumption module 312 may receive data signals SD, SPD, receive command signals RFC, APC, MDC, and then generate and provide the power signals PS1, PS2 to the multiple engine interfaces 320A, 320B so as to thereby control the multiple engines 324A, 324B based on the data signals SD, SPD and the command signals RFC, APC, MDC. Also, in some scenarios, the flight control system 310 may provide audio/visual output to a pilot via a pilot display 360, wherein the pilot is able to interface with the flight control system 310 by way of a control interface 360 associated with the pilot display 360.

The control laws module 316 may generate commands to maintain a suitable yaw, pitch and/or roll of the rotorcraft 104 along with issue commands to maintain the power output provided to the multiple engines 324A, 324B to maintain these three axes. The control laws module 316 may also issue other commands, such as, e.g., G-command, pitch rate feedback or similar, to regulate flight of the rotorcraft 104. The actuators 358 may have any type of actuator that moves a portion of the rotorcraft 104, such as, e.g., rotor blade assemblies, based on the sensor data SD. The actuators 358 may be individually moved between various actuator positions, and the actuators 358 may include main rotor actuators that are operable to adjust the pitch angle of the rotor blade assemblies, collectively and/or cyclically. In some instances, other types of actuators 358 that may be implemented include tail rotor actuators, control surface actuators and/or various other types of actuators.

In some implementations, the power consumption module 312 may be configured to anticipate additional power consumption on the multiple engines 324A, 324B using sensor data SD to form the power signals PS1, PS2 (e.g., power consumption signal). For instance, the power signals PS1, PS2 may be used by the engine interfaces 320A, 320B to adjust the power output of the multiple engines 324A, 324B. In some scenarios, the multi-engine flight formation system 304 may receive sensor data SD that includes a cyclic control position that is detected by the cyclic control sensor 342 so as to adjust the cyclic pitch of the rotor blade assemblies when an increased power output has been demanded from the multiple engines 324A, 324B. Therefore, the power signals PS1, PS2 may cause the engine interfaces 320A, 320B to increase the power output of the multiple engines 324A, 324B.

In some implementations, the multi-engine flight formation system 304 may further compensate for increases in power expectance and power consumption rate due to inputs in various axes, such as laterally or directionally, with differing ambient condition or vehicle state compensation schedules. For instance, in some scenarios, the multi-engine flight formation system 304 may be configured to filter the power signals PS1, PS2 to remove one or more steady components and/or shape the power signals PS1, PS2 to match a flight positioning for formation flight, which may be associated with one or more flight parameters detected by sensors 340. The multi-engine flight formation system 304 may also adjust the power signals PS1, PS2 based on various ambient conditions, such as, e.g., altitude data from the altitude sensor 348 and/or airspeed data from the airspeed sensor 346. Further, in some scenarios, when generating the power signals PS1, PS2, the multi-engine flight formation system 304 may provide differing weights to the sensor data SD, the actuator position commands APC, and/or the actuator position data APD, according to a weighting algorithm. For instance, the power consumption module 312 may attribute differing weights to the data provided by the various sensors 340. Moreover, the power consumption module 312 may weigh data from each of the cyclic control sensor 342, the altitude sensor 348 and the collective control sensor 140 differently when generating the power signals PS1, PS2.

In some implementations, the multi-engine flight formation system 304 may include the maneuver detection module 318 configured to detect various maneuvers (e.g., movement to determine power consumption) performed by the rotorcraft 104 based on the sensor data SD. The multi-engine flight formation system 304 may indirectly use the sensor data SD to form the power signals PS1, PS2 by processing the maneuvers detected by the maneuver detection module 318. Also, the multi-engine flight formation system 304 may have any other equipment that enables aircraft-to-aircraft communication (e.g., wireless networking).

In some implementations, the multi-engine flight formation system 304 may include the reduced-engine operations (REO) feature module 314 to provide the flight control system 310 with capability of a high-efficiency mode of operation for the rotorcraft 104. For instance, the flight control system 310 may be configured to interface with the multiple engines 324A, 324B, e.g., via the power signals PS1, PS2 provided to engine interfaces 320A, 320B. Also, the flight control system 310 may be configured to continuously calculate the minimum altitude of the rotorcraft 104 for reduced-engine operation (REO) based on the aircraft descent rate (ADR) and/or the engine restart time (ERT). Also, the flight control system 310 may be configured to shutdown at least one engine of the multiple engines 324A, 324B if the calculated altitude is determined to be a sufficient altitude for reduced-engine operation (REO). Also, after shutdown, the flight control system 310 may be configured to restart the at least one engine of the multiple engines 324A, 324B if the calculated altitude is determined to be an insufficient altitude for reduced-engine operation (REO).

In some implementations, the aircraft descent rate (ADR) may be based on current ambient conditions related to the altitude (continuously calculated altitude) including outside ambient temperature (OAT), e.g., during autorotation of the rotorcraft 104, when the at least one engine of multiple engines 324A, 324B is shutdown. Also, the engine restart time (ERT) may be a function of the current ambient conditions related to the altitude, outside ambient temperature (OAT), and/or measured gas temperature (MGT) of the at least one engine. In addition, the altitude may be continuously calculated as a minimum altitude needed for the reduced-engine operation (REO) based on a pre-determined balance between the aircraft descent rate (ADR) and the engine restart time (ERT).

In various implementations, the multi-engine flight formation system 304 may have the pilot display 360 with the control interface 362 incorporated as part thereof. For instance, in some scenarios, the flight control system 310 may provide audio/visual output to a pilot via the pilot display 360, wherein the pilot is able to interface with the flight control system 310 by way of the control interface 362 associated with the pilot display 360. Thus, the pilot may communicate with the flight control system 310 by way of the control interface 362 in the pilot display, and also, the flight control interface 310 may communicate with the pilot via the pilot display 360 and/or the control interface 362. Various aspects, features, characteristics, and behaviors that are associated with the pilot display 360 and/or the control interface 362 are described in greater detail herein with reference to FIGS. 4A-4B.

Figure 4B:
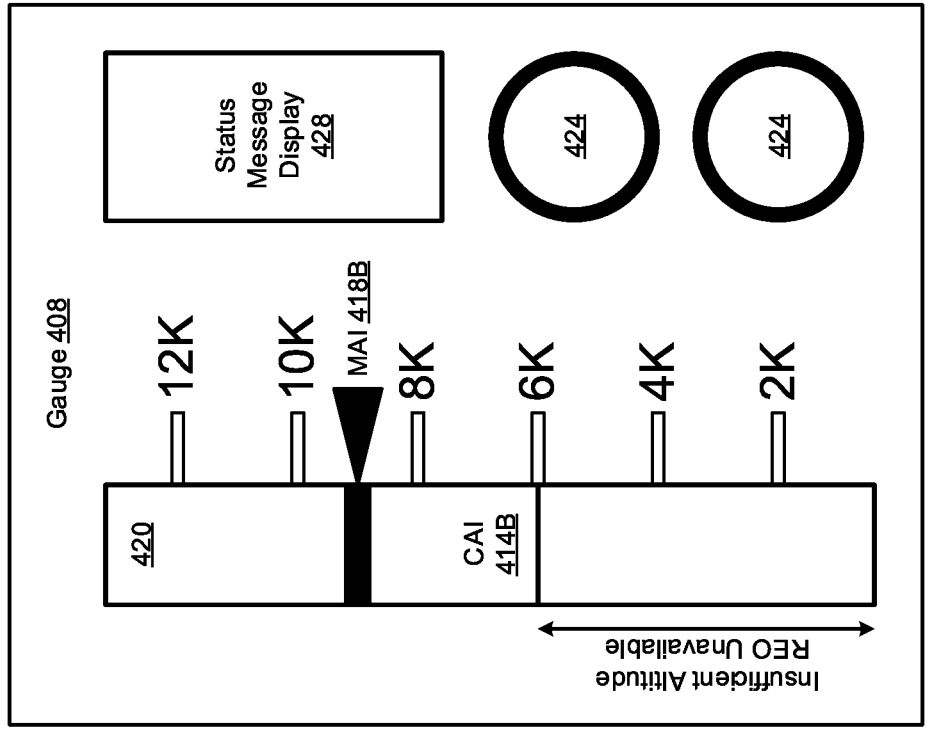
FIGS. 4A-4B illustrate diagrams of reduced-engine operation altitude indicator in accordance with various implementations described herein.
Figure 4A:
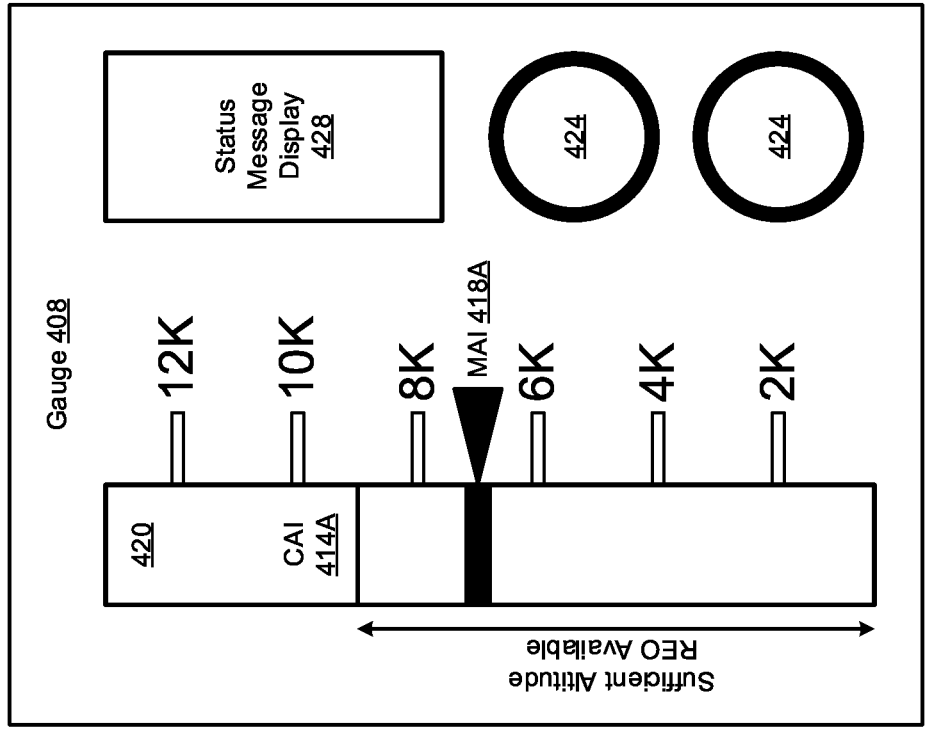

FIGS. 4A-4B illustrate diagrams of reduced-engine operation altitude indicator in accordance with various implementations described herein. In particular, FIG. 4A shows a diagram 400A of reduced-engine operation (REO) altitude indicator 404A, and FIG. 4B shows a diagram 400B of reduced-engine operation (REO) altitude indicator 404B.

In various implementations, as shown in FIGS. 4A-4B, the REO altitude indicator 404A, 404B may be used in the pilot display 360 in FIG. 3, wherein the flight control system 310 may be configured to provide visual indication of the altitude to a pilot with a gauge 408, including, e.g., a current altitude indication (CAI) versus a minimum altitude indication (MAI) for REO. In some instances, as shown in FIG. 4A, a current altitude indication (CAI) 414A is visually provided to the pilot when sufficient altitude makes REO available with a minimum altitude indication (MAI) 418A. In other instances, as shown in FIG. 4B, another current altitude indication (CAI) 414B is visually provided to the pilot when insufficient altitude makes REO unavailable with another minimum altitude indication (MAI) 418B.

The flight control system 310 may be configured to calculate the minimum altitude based on one or more of pressure altitude, density altitude and height above-ground-level (AGL), and the flight control system 310 may also be configured to calculate the altitude with an altitude margin built-in for safety. In some implementations, the gauge 408 may refer to a dedicated REO display control panel that has an altitude gauge 420, one or more push buttons 424 to engage/disengage REO, and a visual display 428 that displays various status messages and caution-warning-advisory (CWA) messages related to the REO system. Also, the flight control system 310 may be configured to prevent activation of the REO when caution-warning-advisory (CWA) messages are active. Also, the gauge 408 may provide a mode message that indicates availability of the REO based on the current altitude versus the minimum altitude, and also, the gauge 408 may provide an engaged-disengaged message that indicates the REO is currently engaged or disengaged.

Figure 5:
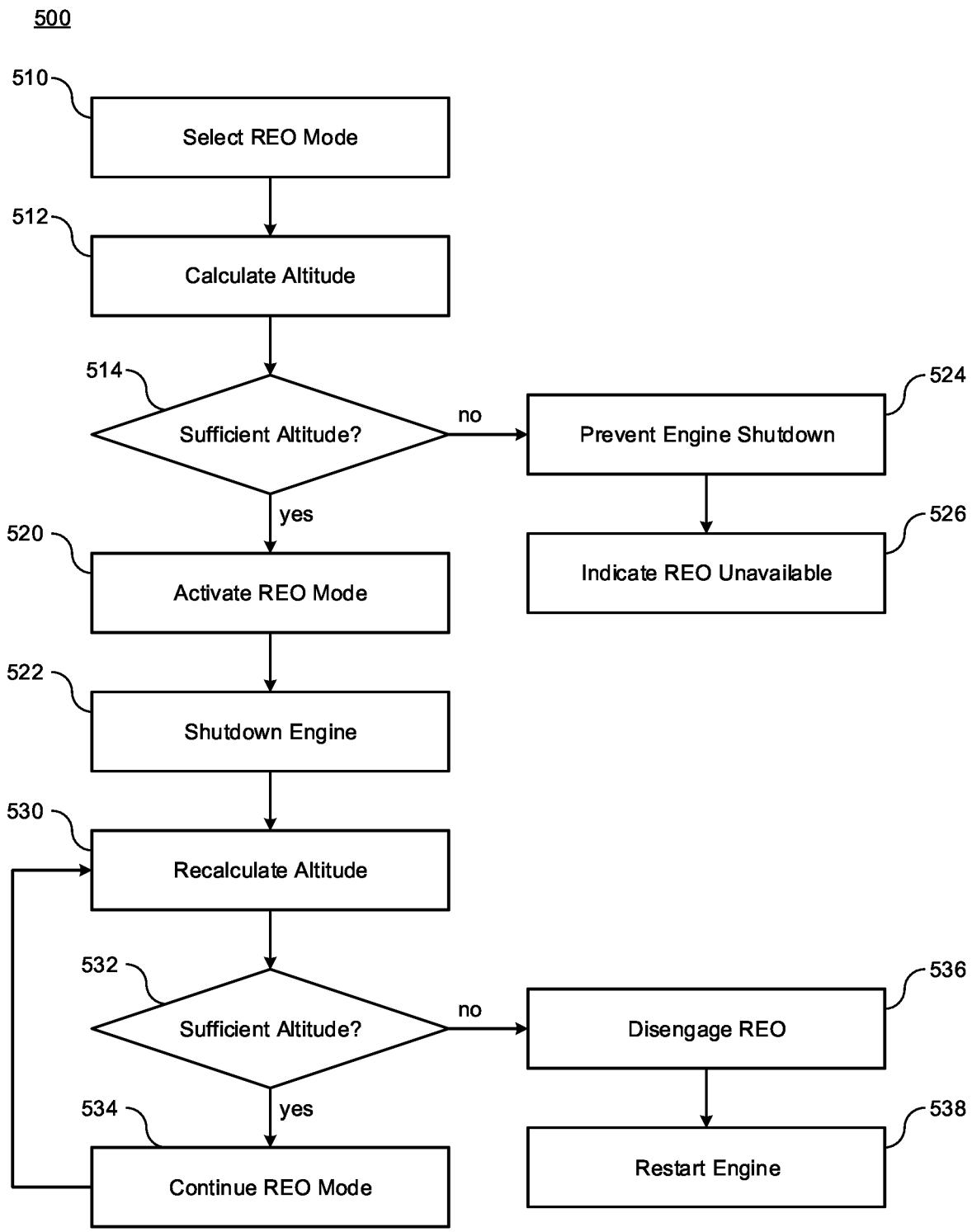
FIG. 5 illustrates a diagram of a method for utilizing a reduced-engine operation technique for a rotorcraft in accordance with implementations described herein.

FIG. 5 illustrates a diagram of a method 500 for utilizing a REO technique for the rotorcraft 104 in accordance with various implementations described herein.

It should be understood that even though method 500 indicates a particular order of operation execution, in some cases, various portions of operations may be executed in a different order, and on different systems. In other cases, additional operations and/or steps may be added to and/or omitted from method 500. Also, method 500 may be implemented in hardware and/or software. For instance, if implemented in hardware, method 500 may be implemented with various components and/or circuitry, as described in FIGS. 1-3 and 4A-4B. In some instances, if implemented in software, method 500 may be implemented as a program or software instruction process that is configured for providing REO techniques for the rotorcraft 104, as described herein. Also, if implemented in software, instructions related to implementing method 500 may be stored in memory and/or a database. Thus, in various implementations, a computer or various other types of computing devices with a processor and memory may be configured to perform method 500.

As described in reference to FIG. 5, the method 500 may be used for fabricating and/or manufacturing, or causing to be fabricated and/or manufactured, an integrated circuit (IC) for a flight control system that implements the various REO techniques in physical design as described herein so as to thereby provide rotorcraft architecture with the REO functionality using various related devices, components and/or circuitry as described herein.

At block 510, method 500 may select REO mode, and at block 512, method 500 may calculate altitude, such as, e.g., a minimum required altitude. At decision block 514, method 500 may determine if sufficient altitude is available for REO mode. Also, method 500 may be configured to continuously calculate altitude of the rotorcraft for REO based on one or more of an aircraft descent rate (ADR) and an engine restart time (ERT). If sufficient altitude is not available, then at block 524, method 500 may prevent engine shutdown, and at block 526, method 500 may indicate that REO mode is not available to a pilot via a pilot display. Otherwise, if sufficient altitude is available, then at block 520, method 500 may activate the REO mode, and method 500 may indicate that REO mode is available to the pilot via the pilot display. At block 522, method 500 may shutdown at least one engine of multiple engines during REO mode.

Also, at block 530 method 500 may recalculate altitude, such as, e.g., a minimum required altitude. At decision block 532, method 500 may determine if sufficient altitude is available for REO mode. If sufficient altitude is not available, then at block 536, method 500 may disengage REO mode, and also, at block 538, method 500 may restart the at least one engine and then indicate that REO is not available to the pilot via the pilot display. Otherwise, at block 534, method 500 may continue REO mode if sufficient altitude is available, and method 500 may return to block 530 to recalculate altitude. As such, in various scenarios of operation, method 500 may be configured to continuously and/or iteratively pass through one or more blocks 530, 532, 534 while sufficient altitude is available for REO mode, or at least until insufficient altitude is calculated, whereby method 500 disengages REO mode at block 536 and then restarts the at least one engine at block 538.

In some implementations, as described in reference to FIG. 5, method 500 may be configured to interface with multiple engines in a rotorcraft, and also, method 500 may be configured to continuously calculate minimum altitude of the rotorcraft for REO based on one or more of an aircraft descent rate (ADR) and an engine restart time (ERT). Also, method 500 may be configured to shutdown at least one engine of multiple engines if the altitude is determined to be a sufficient altitude for REO. Also, method 500 may be configured to restart the at least one engine of the multiple engines if the altitude is determined to be an insufficient altitude for REO. Also, in some scenarios, the multiple engines may have two or more engines, and REO may refer to a high-efficiency mode of operation for shutting-down at least one engine of the two or more engines. In other instances, the multiple engines may have two engines, and the REO may refer to a reduced-engine cruise or a single-engine cruise (SEC) mode of operation for shutting-down at least one engine of the two engines.

In some implementations, the aircraft descent rate (ADR) may be based on current ambient conditions related to the altitude including outside ambient temperature (OAT) during autorotation of the aircraft (or rotorcraft) with the at least one engine of the multiple engines shutdown. Also, the engine restart time (ERT) may refer to a function of the current ambient conditions related to one or more of the current altitude, outside ambient temperature (OAT), and measured gas temperature (MGT) of the at least one engine. Also, the altitude may be continuously calculated as a minimum altitude needed for REO based on a pre-determined balance between the aircraft descent rate (ADR) and the engine restart time (ERT). Also, in various operational scenarios, one or more steps in method 500 may be manually selected based on input from a pilot, and/or one or more steps in method 500 may be automatically selected by a flight control computer, such as, e.g., the flight control system 310. Moreover, in various other operational scenarios, the steps in method 500 may be performed with some combination of manual selection by pilot and automatic selection by a flight control computer, such as, e.g., the flight control system 310 in FIG. 3.

Figure 6:
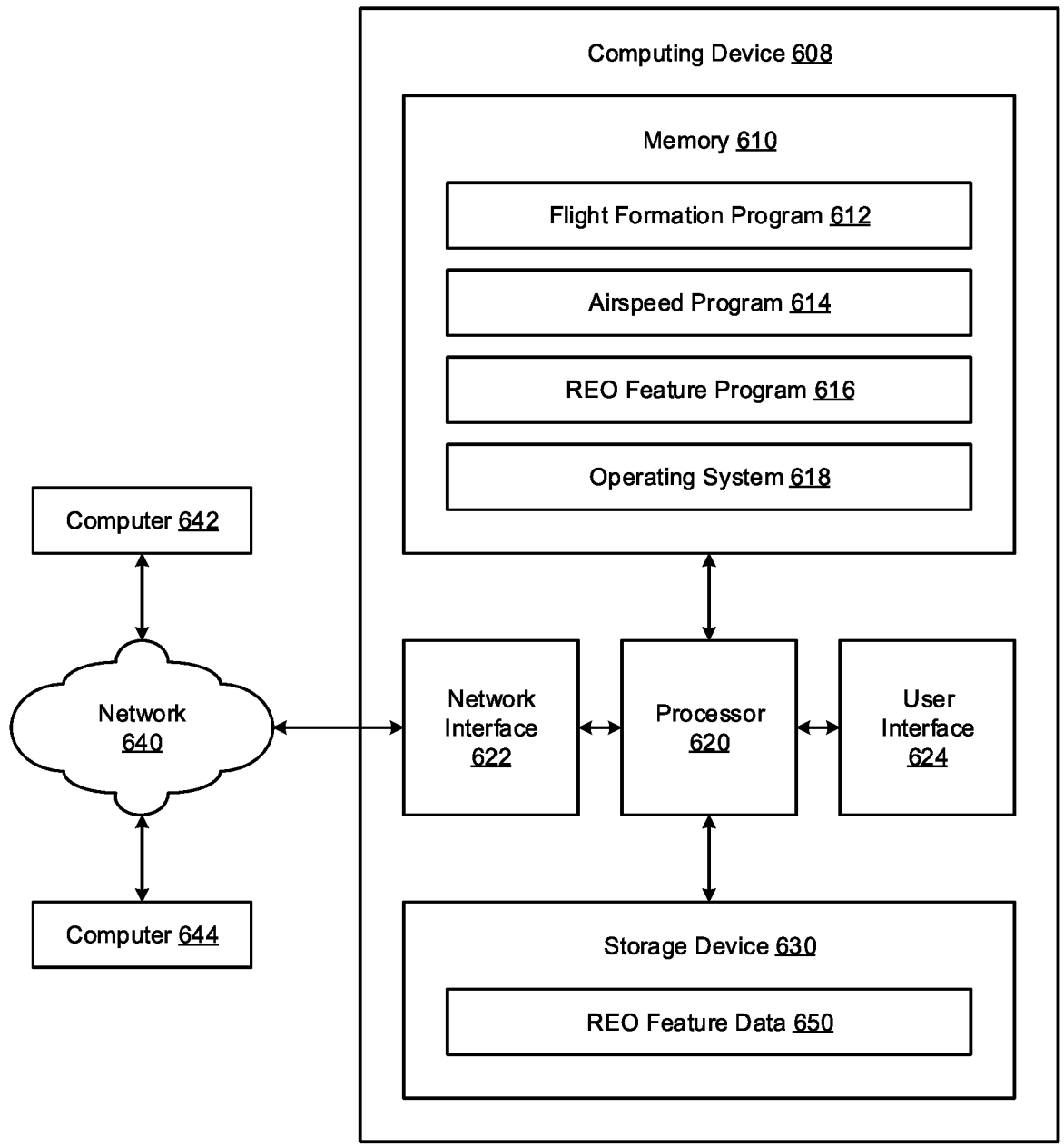
FIG. 6 illustrates a diagram of a computer system for utilizing a reduced-engine operation technique for a rotorcraft in accordance with implementations described herein.

FIG. 6 illustrates a diagram 600 of a flight computer system 604 for utilizing REO techniques for a rotorcraft in accordance with implementations described herein.

The flight computer system 604 (e.g., networked computer system and/or server) is shown in FIG. 6 for the rotorcraft 104 in FIG. 1. The flight computer system 604 may be used to determine, calculate and correct (i.e., adjust) an angle-of-attack parameter (i.e., orientation) for the rotorcraft 104. The flight computer system 604 has a computing device 608 (e.g., computer, flight computer system, flight controls and/or avionics computer system), which may be implemented as a server or a multi-use computer that is coupled via a network 640 to one or more networked (client) computers 642, 644. Various methods, such as, e.g., method 500 in FIG. 5, may be stored as program code (e.g., flight formation program 612, airspeed program 614, REO feature program 616) in memory that may be performed by the computing device 608, the computers 642, 644, various other networked devices (not shown) or a combination thereof. In some implementations, the programs 612, 614, 616 may read input data (e.g., measurements from sensors 340 in FIG. 3 and operating pilot data) and then provide controlled output data to various connected computer systems including, e.g., an associated closed-loop control system.

In various implementations, the computers 608, 642, 644 may refer to any type of computing device, computer system, or some other programmable electronic device having a processor 620 and memory 610. The computers 608, 642, 644 may be implemented using one or more networked (e.g., wired or wirelessly networked) computers, e.g., in a cluster or some other distributed computer system. The computers 608, 642, 644 may be implemented within a single computer or various programmable electronic devices, e.g., an aircraft flight control computer, a ground-based flight control system, a flight monitoring terminal, a laptop computer, a hand-held computer, phone, tablet, or similar. In some instances, the computing device 608 may refer to an onboard flight control computer (e.g., configured to receive sensor data from the rotorcraft 104) on a dispensing aircraft. In this instance, the computing device 608 may be disposed on the rotorcraft 104 to transmit aircraft data to the external networked computers 642, 644 that receive the aircraft data from the rotorcraft 104. Also, the external networked computers 642, 644 may be a part of the flight computer system 604 at a ground location monitoring the rotorcraft 104 and any sensor data related thereto.

In some implementations, the computing device 608 may have the processor 620, such as, e.g., central processing unit (CPU), coupled to the memory 610, a network interface 622 and a user interface 624, such as, e.g., the control interface 362 and/or the pilot display 360 in FIG. 3. The memory 610 may represent random access memory (RAM) devices of the main in the computing device 608, supplemental levels of memory (e.g., cache memory, non-volatile or backup memory (e.g., programmable or flash memory)), read-only memory, or combinations thereof. In addition to the memory 610, the flight computer system 604 may include other memory located elsewhere in the computing device 608, such as, e.g., cache memory in the processor 620, as well as any storage capacity used as a virtual memory (e.g., as stored on a storage device 620 or on another computer coupled to the computing device 608). The memory 610 may have stored thereon various programs, including, e.g., the flight formation program 612, the airspeed program 614, and the REO feature program 616 along with an operating system 618 for onboard operation of the computing device 608.

The computing device 608 may further be configured to communicate information externally to the external network 640 via the network interface 622. To interface with a user, pilot, other operator (e.g., aerodynamicist, engineer), the computing device 608 may include a user interface 624 incorporating one or more user input devices (e.g., a keyboard, a mouse, a touchpad, and/or a microphone, etc.) and a display (e.g., a monitor, a liquid crystal display (LCD) panel, light emitting diode (LED), display panel, and/or speaker, etc.). Also, in other instances, the user input may be received via another computer or terminal. Moreover, the computing device 608 may include the network interface 640, which may be coupled to one or more networks 640 (e.g., a wireless network) to enable communication of information with other computers and electronic devices. The computing device 608 may have analog and/or digital interfaces between the processor 620 and each of the components 622, 624, 630, and also, other non-limiting hardware components and/or environments may be used within the context of illustrated examples and implementations.

The computing device 608 may operate under the control of the operating system 618, and also, the computing device 608 may execute or otherwise rely on various computer software applications, components, programs, objects, modules, data structures, etc. (such as, e.g., the flight formation program 612, the airspeed program 614, and the REO feature program 616, along with related software). The operating system 618 may be stored in the memory 610, and the operating system 618 may refer to, but are not limited to, UNIX® (a registered trademark of The Open Group), Linux® (a registered trademark of Linus Torvalds), Windows® (a registered trademark of Microsoft Corporation, Redmond, WA, United States), AIX® (a registered trademark of International Business Machines (IBM) Corp., Armonk, NY, United States) i5/OS® (a registered trademark of IBM Corp.), and others as will occur to those of skill in the art. The operating system 618, the flight formation program 612, the airspeed program 614, and the REO feature program 616 are shown in the memory 610, but components of the aforementioned software may also, or in addition, be stored at non-volatile memory (e.g., on storage device 630 (data storage) and/or other non-volatile memory (not shown). Moreover, various applications, components, programs, objects, modules, etc. may execute on one or more processors in another computer coupled to the computing device 608 via the network 640 (e.g., in a distributed or client-server computing environment) where processing to implement the functions of a computer program may be allocated to multiple computers 642, 644 over the network 640. Also, REO data 650 may be stored in storage device 630 for retrieval by the processor 620 and/or the memory 610.

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of an aircraft having a multi-engine configuration with multiple engines. The aircraft may have a flight control system coupled to the multiple engines with a multi-engine interface. The flight control system may be configured to shut-down at least one engine of the multiple engines during reduced-engine operation by continuously calculating altitude for the reduced-engine operation based on one or more of an aircraft descent rate of the aircraft and an engine restart time of the at least one engine.

Described herein are various implementations of an aircraft having a multi-engine configuration with multiple engines. The aircraft may have a flight control system coupled to the multiple engines with a multi-engine interface. The flight control system may be configured to shut-down at least one engine of the multiple engines during a reduced engine cruise by continuously calculating altitude based on one or more of an aircraft descent rate and an engine restart time.

Described herein are various implementations of a method. The method may interface with multiple engines in a rotorcraft. The method may continuously calculate altitude of the rotorcraft for reduced-engine operation based on one or more of an aircraft descent rate and an engine restart time. The method may shut-down at least one engine of the multiple engines if the altitude is determined to be a sufficient altitude for the reduced-engine operation. The method may restart the at least one engine of the multiple engines if the altitude is determined to be an insufficient altitude for the reduced-engine operation.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, well-known methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. An aircraft comprising:
multiple engines; and
a flight control system coupled to the multiple engines with a multi-engine interface,
wherein the flight control system is configured to shutdown at least one engine of the multiple engines during a reduced-engine operation by continuously calculating altitude for the reduced-engine operation based on one or more of an aircraft descent rate of the aircraft and an engine restart time of the at least one engine.

2. The aircraft of claim 1, wherein:
the multiple engines comprise two or more engines, and
the reduced-engine operation comprises a high-efficiency mode of operation for shutting-down at least one engine of the two or more engines.

3. The aircraft of claim 1, wherein:
the multiple engines comprise two engines, and
the reduced-engine operation comprises a single-engine cruise mode of operation for shutting-down at least one engine of the two engines.

4. The aircraft of claim 1, wherein:
the aircraft descent rate is based on current ambient conditions related to the altitude including outside ambient temperature during autorotation of the aircraft with the at least one engine of the multiple engines shutdown, and
the engine restart time is a function of the current ambient conditions related to one or more of the altitude, outside ambient temperature, and measured gas temperature of the at least one engine.

5. The aircraft of claim 1, wherein:
the flight control system continuously calculates the altitude as a minimum altitude needed for the reduced-engine operation based on a pre-determined balance between the aircraft descent rate and the engine restart time.

6. The aircraft of claim 1, wherein:
the flight control system provides visual indication of the altitude to a pilot with a gauge including current altitude versus a minimum altitude for the reduced-engine operation,
the flight control system is configured to calculate the altitude based on one or more of pressure altitude, density altitude and height above-ground-level, and
the flight control system is configured to calculate the altitude with an altitude margin built-in for safety.

7. The aircraft of claim 6, wherein:
the gauge refers to a dedicated reduced-engine operation display control panel that includes an altitude gauge, one or more push buttons to engage/disengage the reduced-engine operation, and a visual display that displays status messages and caution-warning-advisory messages related to reduced-engine operation, and
the flight control system is configured to prevent activation of the reduced-engine operation when the caution-warning-advisory messages from full autonomy digital engine control (FADEC) are active.

8. The aircraft of claim 6, wherein:
the gauge provides a mode message that indicates availability of the reduced-engine operation based on the current altitude versus the minimum altitude, or
the gauge provides an engaged-disengaged message that indicates the reduced-engine operation is currently engaged or disengaged.

9. The aircraft of claim 1, wherein:
the flight control system is configured to selectively shutdown at least one engine of the multiple engines based on input from a pilot, and
the flight control system is configured to provide visual indication of the at least one engine selectively shutdown by the pilot.

10. The aircraft of claim 1, wherein:
while in the reduced-engine operation during flight, if the altitude as a current altitude drops below a predetermined altitude, then the flight control system is configured to automatically restart the shutdown engine and provide corresponding advisory messages to a pilot.

11. The aircraft of claim 1, wherein:
when the reduced-engine operation is selectively activated by a pilot during flight, the flight control system is configured to calculate and determine whether sufficient altitude is available or unavailable for reduced-engine operation, and
if the sufficient altitude is determined, the flight control system is configured to allow engine shutdown of the at least one engine during the reduced-engine operation and also provide an indication message to the pilot that the reduced-engine operation is available and active, and
if insufficient altitude is determined, the flight control system is configured to prevent engine shutdown of the at least one engine during flight and also provide a warning message to the pilot that the reduced-engine operation is unavailable and inactive.

12. The aircraft of claim 1, wherein:
upon selective activation of the reduced-engine operation by a pilot, the flight control system is configured to adjust operation of the at least one engine of the multiple engines by throttling the at least one engine to IDLE, sub-IDLE, or completely OFF.

13. The aircraft of claim 1, wherein:
upon activation of the reduced-engine operation by a pilot, the flight control system is configured to reduce airspeed prior to shutdown of at least one engine of the multiple engines so as to prevent over-torque or over-temperature on at least one active engine of the multiple engines when the at least one engine is shutdown.

14. The aircraft of claim 1, wherein:
the aircraft comprises a rotorcraft, and
the multiple engines comprise multiple turbo-shaft engines.

15. An aircraft comprising:
multiple engines; and
a flight control system coupled to the multiple engines with a multi-engine interface,
wherein the flight control system is configured to shutdown at least one engine of the multiple engines during a reduced-engine cruise by continuously calculating altitude based on one or more of an aircraft descent rate and an engine restart time.

16. The aircraft of claim 15, wherein:

the aircraft descent rate is based on current ambient conditions related to the altitude including outside ambient temperature during autorotation of the aircraft with the at least one engine of the multiple engines shutdown, the engine restart time is a function of the current ambient conditions related to one or more of the altitude, outside ambient temperature, and measured gas temperature of the at least one engine, and the altitude is continuously calculated as a minimum altitude needed for the reduced-engine cruise based on a pre-determined balance between the aircraft descent rate and the engine restart time.

17. A method comprising:

interfacing with multiple engines in a rotorcraft;

continuously calculating altitude of the rotorcraft for a reduced-engine operation based on one or more of an aircraft descent rate and an engine restart time;

shutting-down at least one engine of the multiple engines if the altitude is determined to be a sufficient altitude for the reduced-engine operation; and restarting the at least one engine of the multiple engines if the altitude is determined to be an insufficient altitude for the reduced-engine operation.

18. The method of claim 17, wherein:

the multiple engines comprise two or more engines, and the reduced-engine operation comprises a high-efficiency mode of operation for shutting-down at least one engine of the two or more engines.

19. The method of claim 17, wherein:

the multiple engines comprise two engines, and the reduced-engine operation comprises a single-engine cruise mode of operation for shutting-down at least one engine of the two engines.

20. The method of claim 17, wherein:

the aircraft descent rate is based on current ambient conditions related to the altitude including outside ambient temperature during autorotation of the aircraft with the at least one engine of the multiple engines shutdown, the engine restart time is a function of the current ambient conditions related to one or more of the altitude, outside ambient temperature, and measured gas temperature of the at least one engine, and the altitude is continuously calculated as a minimum altitude needed for the reduced-engine operation based on a pre-determined balance between the aircraft descent rate and the engine restart time.

* * * * *